Figure 1:
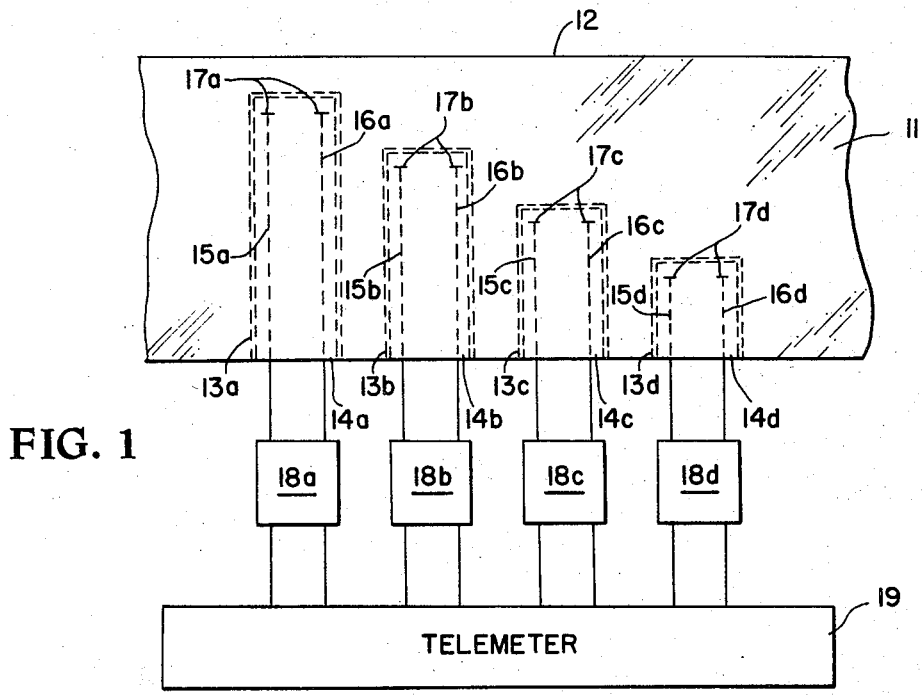

Dec. 12, 1967     P. J. LE BEL     3,357,237

ABLATION SENSOR

Filed June 17, 1965

INVENTOR
PETER J. LEBEL

BY

*q McCoy*
*William H. King*
ATTORNEYS

United States Patent Office 3,357,237
Patented Dec. 12, 1967

3,357,237
ABLATION SENSOR
Peter J. Le Bel, Newport News, Va., assignor to the United States of America as represented by the Administrator of the National Aeronautics and Space Administration
Filed June 17, 1965, Ser. No. 464,880
10 Claims. (Cl. 73—86)

The invention described herein may be manufactured and used by or for the Government of the United States of America for governmental purposes without the payment of any royalties thereon or therefor.

This invention relates generally to an ablation sensor and more specifically concerns an ablation sensor for measuring the char layer interface recession rate of a charring ablator.

In developing ablation heat shield materials for space flights, it is necessary to make certain measurements of the thermal characteristics of the ablation materials. Some of these measurements include rate of recession of the char layer interface and rate of recession of the ablating surfaces of the ablation materials. The char layer interface is the intersurface of a char layer that its immediately below the ablating surface of a charring ablator. In the past, there have been no devices for measuring the rate of recession of the char layer interface. However, there are several previous ablation sensors that are used for measuring the rate of recession of the ablating surface. Two of these previous sensors are the breakwire sensor and the variable capacitance sensor. The breakwire ablation sensor utilizes a series of fine wires stepped in depth in the ablation material. When the material surface recedes to the level of the first wire, the wire burns thereby interrupting its continuity. As the surface ablates to the levels of the successive wires, similar occurrences result whereby means are provided for making ablation rate measurements. The disadvantages of the breakwire ablation sensor are twofold: the sensor output is affected by the layer of plasma formed around a spacecraft during its reentry into the earth's atmosphere which shorts the wires with a continually varying resistance, and the sensor is not usable in charring ablators because of the shortening effect of the electrically conductive char layer.

The variable capacitance ablation sensor is a concentric cylinder capacitor oriented so that the axis of the cylinder is perpendicular to the ablation surface. As the material surface recedes, the height of the concentric cylinder decreases at the same rate thereby changing the area of the capacitor plate and thus varying the capacitance. This ablation sensor also has two distinct disadvantages: it sometimes produces erroneous readings because its capacitor plates become shorted by the layer of plasmas formed around a spacecraft during reentry into the earth's atmosphere, and it cannot be used in a charring ablator because of the shorting effect of the char layer.

It is therefore an abject of this invention to provide an ablation sensor that can be used to accurately and reliably measure the rate of recession of the char layer interface of a charring ablation material.

A further object of this invention is to provide an ablation sensor that will sense when the char layer interface of a charring ablation material has recessed to a predetermined layer.

Another object of this invention is to provide an ablation sensor for measuring the rate of recession of the char layer interface of a charring ablation material during reentry into the earth's atmosphere that is not affected by the layer of plasma surrounding the reentry body.

Still another object of this invention is to provide an ablation sensor that utilizes the char layer of an ablating charring surface.

The ablation sensor that constitutes the present invention consists essentially of two wires embedded in the ablation material. One end of each of these wires is embedded in the material at the same predetermined level. The other ends of these two wires protrude out of the ablation material. When the char layer interface recedes to the said predetermined level, the char layer electrically connects the two embedded ends of the wires together. An electrical circuit means is connected to the other ends of the two wires to sense when the embedded ends are connected together. A series of these sensors stepped in depth in the ablation material provides means for measuring the rate of recession of the char layer interface.

Figure 2:
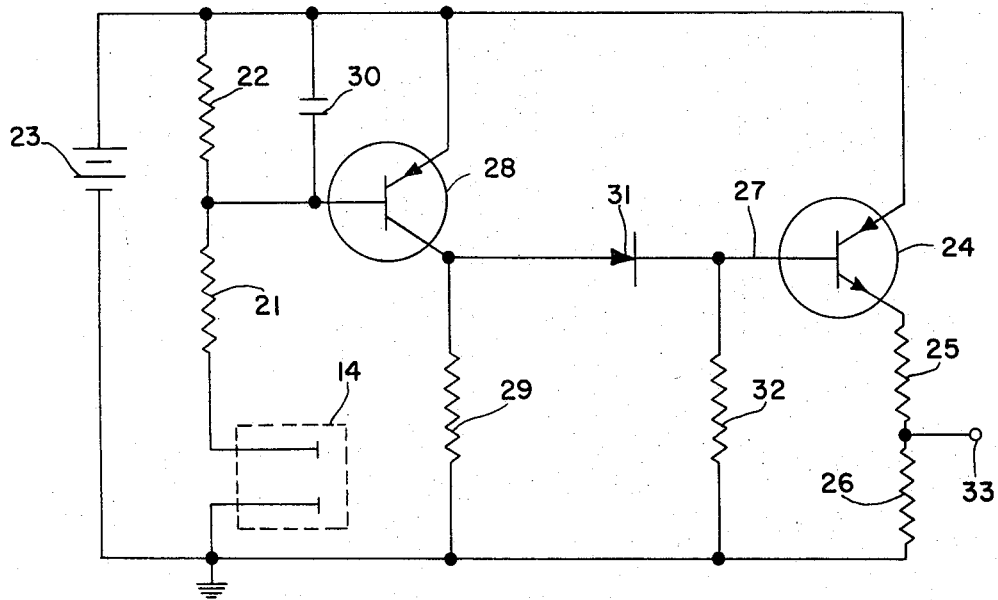

Other objects and advantages of the invention will further become apparent hereinafter and in the drawings, in which:

FIG. 1 is a schematic drawing of the invention; and
FIG. 2 is a schematic diagram of the electrical circuit means 18 shown in FIG. 1.

In describing the preferred embodiment of the invention selected for illustration in the drawings, the number be resorted to for the sake of clarity. However, it is not intended to be limited to the specific terms so selected and it is to be understood that each supecific term includes technical equivalents which operate in a similar manner to accomplish a similar purpose.

Turning now to the specific embodiment of the invention selected for illustration in the drawings, the number 11 designates generally a piece of charring ablation material whose char layer interface recession rate is to be measured. A surface 12 is the ablating surface of the ablation material. Since ablation material 11 is a charring ablation material, a char layer interface will always precede the ablating surface 12. The rate of recession of the char layer interface is what is to be measured by this invention. Opposite surface 12 there are several holes 13a, 13b, 13c, and 13d drilled into the ablation material 11. A sensor plug 14 is inserted into each of these holes 13: sensor plugs 14a, 14b, 14c, and 14d are inserted into holes 13a, 13b, 13c, and 13d, respectively. A sensor plug 14 consists of a plug of ablation material into which a wire 15 and a wire 16 are embedded. One end of wire 15 and one end of wire 16 are embedded in the ablation material at the same predetermined level. The other ends of wires 15 and 16 protrude out of sensor plug 14. Wires 15 and 16 are ten mil platinum wires. The embedded ends of wires 15 and 16 have thirty mil peens 17 to provide larger surface area for good contact with the char layer interface. Platinum wire was used because it does not form an oxide which will insulate the wires from the char as most metals do when heated. Each pair of wires 15 and 16 is connected electrically to a corresponding electrical circuit means 18 that produces a voltage output when the embedded ends of wires 15 and 16 are connected together by the char layer. This voltage produced by electrical circuit means 18 is applied to a telemeter 19 where it is transmitted back to earth.

It should be noted that each sensor plug 14 has only one pair of wires 15 and 16 embedded in it. However, in actual practice, there are many such pairs of wires 15 and 16 embedded in each sensor plug 14. Each of these pairs of wires is embedded at a different predetermined level and each pair of wires is connected to a different electrical circuit means 18. There are several ways in which the wires 15 and 16 can be embedded in the ablation material of each sensor plug 14. One way is to drill pairs of holes in the plug to different predetermined levels, insert the wires and peens into the holes, and then fill up any voids in the holes with an epoxy resin. Another way is to use a soft ablation material for the sensor plug 14, and slice the plug into two or more sections, place the wires between the different sections, and then compress the sections together to embed the wires in the sensor plug.

Referring now to FIG. 2, one of the electrical circuit means 18 in FIG. 1 will be described in detail. A sensor plug 14 is connected in series with a resistor 21 and a resistor 22. This series circuit is connected in parallel with a voltage source 23 having its negative terminal grounded. Another series circuit consisting of a switch 24, a resistor 25 and a resistor 26 is also connected in parallel with voltage source 23. Switch 24 is a three-terminal PNPN semiconductor. Its construction is similar to a PNPN diode except an ohmic connection is made to its isolated P region. The insertion of a pulse of current into this region causes the device to switch from its high impedance "off" state to a very low impedance "on" state, thus allowing control of current, much as in a thyratron. The connection 27 to switch 24 is the connection made to its isolated P region. Once the switch 24 is actuated to its "on" state by a pulse applied to connection 27, the switch will not return to its "off" state. A PNP transistor 28 is connected in series with a resistor 29 across voltage source 23. The base of transistor 28 is connected to the junction of resistors 21 and 22. A capacitor 30 is connected in parallel with resistor 22. The collector of transistor 28 is connected through a diode 31 to the connection 27 of switch 24 which is connected to ground through a resistor 32. The output of the circuit in FIG. 2 is at a terminal 33 across resistor 26. Resistors 21 and 22 form a voltage divider that applies voltage to the base of transistor 28 when the two wires in the sensor plug 14 are connected together by the char layer interface. Resistor 21 is not absolutely necessary, but it is desirable since it limits the current in the circuit. The resistor 32 is a bias resistor for switch 24 and the resistor 25 is a resistor to drop the voltage output at terminal 33 to a desired level. As has been mentioned previously, there will be several pairs of wires in each sensor plug 14. Consequently, there is a large amount of capacitance linking these different circuits together. Because of this capacitance when one of the circuits 18 is conducting there is a great likelihood that it might cause another circuit 18 to conduct prematurely. This is the purpose of capacitor 30. It is to counteract the capacitance between the pairs of wires in the sensor plug 14. With capacitor 30 the different electrical circuit means 18 are less likely to be actuated prematurely.

In operation, before the char layer interface reaches the embedded ends of the two wires of a sensor the switch 24 will not be conducting and the potential at terminal 33 will be at ground. As soon as the char layer interface reaches the two ends of the two embedded wires of the sensor the char layer will electrically connect the two ends and connect resistors 21 and 22 across voltage source 23. The resulting voltage drop across resistor 22 causes the base of transistor 28 to become negative with respect to the emitter of the transistor thereby causing it to conduct. This conduction causes a positive potential to be produced across resistor 29 which is applied through diode 31 to connection 27 of switch 24 causing it to be actuated to its "on" state. This causes current to flow through resistors 25 and 26 which produces a positive potential at terminal 33. The potential at terminal 33 is applied to the telemeter 19. Inasmuch as there are many of the sensors 14 at different predetermined levels in the material 11, the rate of recession of the char layer interface can be determined. Further changes in sensor resistance due to the plasma will not affect the output at terminal 33 since switch 24 remains in its "on" state.

The advantages of this invention are that it provides a means for measuring the rate of recession of the char layer interface of a charring ablation material; it is not affected by the plasma formed around a reentry spacecraft; it makes use of the electrical shorting effect of the char which impairs the operation of previous sensors; it has a small thermal mass which has no effect on the physical properties of the ablation material; and it has no moving parts, is extremely simple and highly reliable and will withstand the severe environment associated with spacecraft.

It is to be understood that the form of the invention herewith shown and described is to be taken as a preferred embodiment. Various changes may be made in the shape, size and arrangement of parts. For example, equivalent elements may be substituted for those illustrated and described herein, parts may be reversed, and certain features of the invention may be utilized independently of the use of other features, all without departing from the spirit or scope of the invention as defined in the following claims.

What is claimed is:

1. An ablation sensor for sensing when the char layer interface of a charring ablation material has recessed to a predetermined level comprising: a first wire embedded in said ablation material such that its first end is at said predetermined level and such that its second end is protruding out of said ablation material; a second wire embedded in said ablation material such that its first end is at said predetermined level close to the said first end of said first wire and such that its second end is protruding out of said ablation material; and electrical circuit means connected to the said second ends of said first and second wires for detecting when the char layer interface electrically connects together the said first ends of said first and second wires thereby indicating that the char layer interface has recessed to said predetermined level.

2. An ablation sensor in accordance with claim 1 wherein the first ends of said first and second wires have peens to provide larger surface area for better contact with the char layer.

3. A ablation sensor for sensing when the char layer interface of a charring ablation material has recessed to a predetermined level comprising: a first wire embedded in said ablation material such that its first end is at said predetermined level and such that its second end is protruding out of said ablation material; a second wire embedded in said ablation material such that its first end is at said predetermined level close to the first end of said first wire and such that its second end is protruding out of said ablation material; a voltage source, a first resistor and a second resistor connected in series across the second ends of said first and second wires; a switch and a third resistor connected in series across said voltage source; and electrical circuit means connected between the junction of said first and second resistors and said switch to actuate said switch when said char layer interface electrically connects the first ends of said first and second wires together whereby a voltage is produced across said third resistor thereby indicating that said char layer interface has receded to said predetermined level.

4. An ablation sensor in accordance with claim 3 wherein said switch remains in its actuated state once it has been actuated thereby maintaining a voltage across said third resistor.

5. An ablation sensor in accordance with claim 3 wherein said switch is a PNPN switch.

6. An ablation sensor in accordance with claim 3 wherein said electrical circuit means includes a PNP transistor and a resistor connected in series across said voltage source.

7. A plurality of ablation sensors for determining the rate of recession of the char layer interface of a charring ablation material comprising: a plurality of pairs of wires embedded in said ablation material such that the first ends of each pair of wires is located at a different predetermined level and such that the second ends of said pairs of wires protrude out of said ablation material; and electrical circuit means for each of said pairs of wires connected across the second end of each of said pairs of wires to detect when the char layer interface electrically connects the first ends of said pairs of wires whereby the rate of recession of the char layer interface can be determined.

8. A plurality of ablation sensors in accordance with claim 7 wherein the first ends of said pairs of wires have peens to provide larger surface area for better contact with the char layer.

9. A plurality of ablation sensors in accordance with claim 7 wherein said electrical circuit means comprises a first resistor, a second resistor and the second ends of a pair of wires connected in series across a voltage source, a switch and a third resistor connected in series across said voltage source, and means for actuating said switch when a voltage drop occurs at the junction of said first and second resistors whereby a voltage occurs across said third resistor indicating that the char layer interface has receded to the predetermined level of the first ends of the pair of wires.

10. A plurality of ablation sensors in accordance with claim 9 wherein said switch is a switch that remains in its actuated state once it has been actuated thereby maintaining a voltage across said third resistor.

References Cited
UNITED STATES PATENTS

| | | | |
|---|---|---|---|
| 3,078,707 | 2/1963 | Weaver | 73—86 |
| 3,201,973 | 8/1965 | Fitzgerald et al. | 73—35 |
| 3,267,721 | 8/1966 | Jacobs et al. | 73—35 |

JAMES J. GILL, *Primary Examiner.*

R. SALZMAN, *Assistant Examiner.*